United States Patent [19]

Nagahiro et al.

[11] 3,811,640

[45] May 21, 1974

[54] TAKEN-UP TAPE QUANTITY INDICATING SYSTEM

[75] Inventors: Michinori Nagahiro, Nishinomiya; Toshiomi Yabu, Kyoto; Hiroo Hosono, Hirakata; Masaharu Ushihara, Katano, all of Japan

[73] Assignee: Matsushita Electric Industrial Co., Ltd., Osaka, Japan

[22] Filed: Oct. 12, 1972

[21] Appl. No.: 297,072

[30] Foreign Application Priority Data

Oct. 15, 1971 Japan .............................. 46-95867

[52] U.S. Cl. .............................. 242/191, 200/61.15

[51] Int. Cl. .... B65h 59/38, G03b 1/02, G11b 15/13

[58] Field of Search .......................... 242/188–191; 200/61.15; 274/4 R, 4 D

[56] References Cited

UNITED STATES PATENTS

| | | | |
|---|---|---|---|
| 2,943,804 | 7/1960 | Loewe et al. | 242/191 X |
| 2,954,940 | 10/1960 | Herrmann | 242/190 |

*Primary Examiner*—Leonard D. Christian
*Attorney, Agent, or Firm*—Stevens, Davis, Miller & Mosher

[57] ABSTRACT

A taken-up tape quantity indicating system for indicating the taken-up quantity of tape by an indicating pointer rotated in association with the forward and reverse rotation of tape drive means. In the rewind operation, the reaching of zero point by the indicating pointer is detected, and the rewind operation is stopped after a predetermined time delay from the detection of the reaching of the zero point.

3 Claims, 5 Drawing Figures

PATENTED MAY 21 1974 3,811,640

TAKEN-UP TAPE QUANTITY INDICATING SYSTEM

This invention relates to a taken-up tape quantity indicating system for magnetic recording and reproducing systems and similar systems using magnetic tape medium.

In magnetic recording and reproducing systems, for instance in a magnetic video tape recorder (VTR) using single reel type cartridge, the cartridge tape is played back from the outset or pay-off end of the tape after its loading. Therefore, the indicating pointer of the taken-up tape quantity indicating means should initially show zero point (or origin) of the gradations.

To this end, the indicating pointer should always be returned to the zero point position at the completion of re-winding of a previous cartridge tape.

The means to indicate the taken-up tape quantity usually utilize the rotation of a tape drive means such as a reel base to indicate the taken-up tape quantity in terms of the corresponding number of rotations of such tape drive means. However, with these means the indicating pointer will not always indicate the zero point after completion of the rewind operation due to difference between tape speed at the time of recording or playback and tape speed at the time of rewind or fast feed operation and such other factors as variations of the tape tension.

An object of the invention is to provide a taken-up tape quantity indicating system, with which the indicating pointer will always show the initial point (zero point) at the completion of the rewind operation.

Another object of the invention is to provide a taken-up tape quantity indicating system comprising a rotor rotating in association with a tape drive means, a taken-up tape quantity indicating pointer driven through frictional coupling with said rotor, a switch means driven when said indicating pointer is indicating zero point in connection with the movement of said indicating pointer, a means to stop the movement of said indicating pointer when said indicating pointer reaches the zero point, a delaying means to delay the output of said switch means, and a means to stop the rewind operation of said tape drive means according to the output of said delaying means.

The above and other objects of the invention will become more apparent from the following description of a preferred embodiment with reference to the accompanying drawing, in which.

Figures 1, 2, 3, 4, 5:
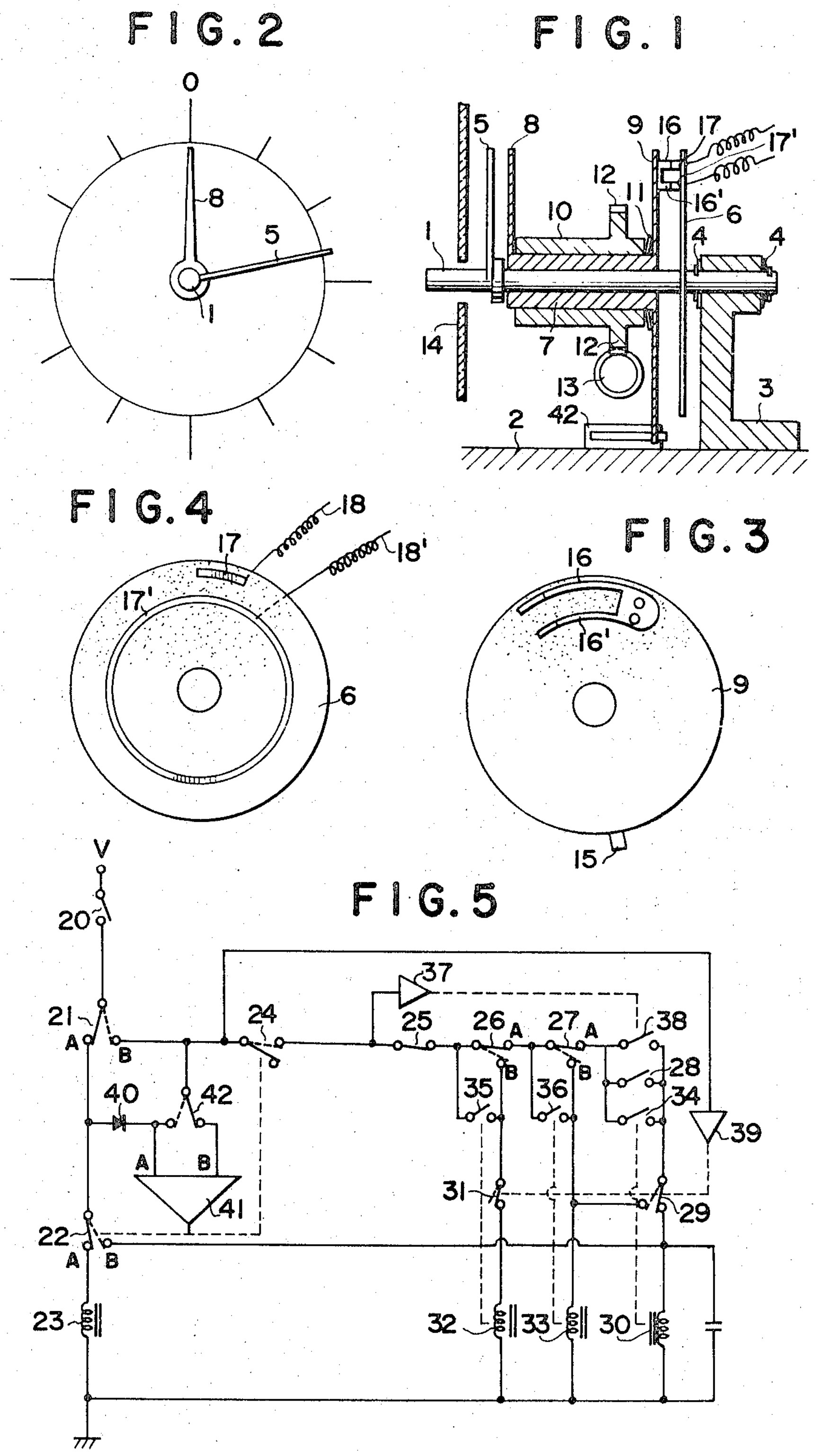
FIG. 1 is a fragmentary sectional view showing an embodiment of the invention.
FIG. 2 is an elevational view of part of the same embodiment.
FIGS. 3 and 4 are plan views of respective component parts.
FIG. 5 is a schematic showing electric connection of the same embodiment.

Referring to the drawing, a setting knob shaft 1 is rotatably mounted on a support 3 secured to a base plate 2. The knob shaft 1 is spring biased by a spring 4 provided between it and the support 3, so that for the rotation of the shaft 1 a force surpassing the frictional force provided by the spring is required. The knob shaft 1 carries a setting pointer 5 and a first contact plate 6 both secured to it. Concentrically fitted on the knob shaft 1 is a hollow cylindrical member 7 which is rotatable relative thereto. The member 7 has an indicating pointer 8 secured to its one end and a second contact plate 9 secured to its other end. The first and second contact plates 6 and 9 face each other. A drive member 10 is slidably coupled through a spring 11 to the cylindrical member 7, and it has a peripheral gear 12.

Meshing with the gear 12 is a gear 13, which is, for instance, coupled to a rotor coupled to a reel base and rotating with the progress of tape.

Numeral 14 designates a transparent front plate, which is graduated in correspondence to the tape feed extent and concentrically with respect to the knob shaft 1 as shown in FIG. 2.

FIG. 3 shows the second contact plate 9. As is shown, it has a peripheral protuberance 15, which is adapted to engage and drive a switch 42 provided on the base plate as well as checking further rotation of the member 7 when the pointer 8 comes to zero point of gradation. The second contact plate 9 has also brush 16 and 16' electrically connected to each other provided on its side facing the first contact plate 6.

FIG. 4 shows the first contact plate 6. As is shown, it is provided on its side facing the second contact plate 9 with a short arcular contact 17 and an annular contact 17'. The first and second contact plates 6 and 9 constitute a control switch such that current is passed between leads 18 and 18' only when the brush 16 and contact 17 are in contact with each other. The operation of the system is controlled by this current.

FIG. 5 shows the internal electric connection. A power supply V may be connected in series with a power supply switch 20, a change-over switch 21 to be described hereinafter and a relay switch 22 to a leader tape pay-out solenoid 23. The change-over switch 21 has its contact B connected in series with a relay switch 24, a stop operation switch 25, a fast feed operation switch 26, a rewind operation switch 27, a recording and playback operation switch 28 and a relay switch 29 to a solenoid 30 for recording and playback operation. The fast feed operation switch 26 has its contact B connected through a relay switch 31 to a fast feed operation solenoid 32, and the rewind operation switch 27 has its contact B connected to a rewind operation solenoid 33. Numerals 34, 35 and 36 designate self-sustension switches for the respective solenoids 30, 32 and 33. Numeral 37 designates a delaying relay which is so constructed as to render a switch 38 "on" only during an initial short period of voltage impression upon it. Numeral 39 designates a detector to detect a predetermined mark provided on the tape at such position as the last end thereof. Upon detection of such mark, it drives the poles of the relay switches 29 and 31 to the dashed line side. The junction between the change-over switch 21 and relay switch 22 is connected through a diode 40 to a terminal A of the delaying relay 41, and the juncture between the change-over switch 21 and relay switch 41 is connectable through the switch 42 to either terminal A or B of the delaying relay 41.

The operation of the construction described above will now be described. By closing the power supply switch 20 and subsequently loading a casette in the recording and reproducing system, the change-over switch 21 is first thrown to the solid line side to actuate the leader tape pay-out solenoid 23 for progressively paying out the leader tape from the cassette to be taken up on a take-up reel in a well-known manner. Concurrently, the source voltage is also coupled through the diode 40 to the terminal A of the delaying relay 41, which thus drives the poles of the relay switches 22 and 24 to the dashed line side after a predetermined delay time required for the leader tape to be taken up on the take-up reel.

When the relay switch 22 is thrown to the B terminal side, current is caused to pass through the recording/-playback operation solenoid 30, thus bringing the recording and reproducing system into the recording or playback state.

The solenoid 30 thus energized has the effect of throwing the change-over switch 21 to the B terminal side, and this state is subsequently maintained oven if the power source of the solenoid 30 is cut off. Also, when this state is brought about, the source voltage is coupled through the relay switch 24 to the delaying relay 37, which thus renders the relay switch 38 "on" for a short period, causing current to pass through the recording/playback solenoid 30. Thereafter, the self-substaining switch 34 acts to maintain the recording/-playback state.

The recording/playback state continues to prevail until the detector 39 detects a mark provided on the tape end, whereupon the relay switches 29 and 31 are driven to the dashed line side. As a result, current is caused to pass through the relay switch 29 into the rewind operation solenoid 33, while simultaneously closing the self-sustaining relay switch 36, so that the rewind operation automatically sets in. If the detector 39 is actuated in the fast feed state, the relay switch 31 is opened to stop the fast feed operation.

Meanwhile, as the tape is progressively taken up, for instance, in the recording/playback state, the contact plate 9 shown in FIG. 1 is rotated through the gears 13 and 12, drive member 10 and cylindrical member 7, so that the indicating pointer 8 indicates the take-up quantity or extent. Simultaneously with the begining of the rotation of the contact plate 9, the switch 42 that has been urged by the protuberance 15 of the contact plate 9 is driven to the dashed line side in FIG. 5, so that the source voltage V turns to be coupled through the switches 21 and 42 to the terminal A of the delaying relay 41.

When the indicating pointer returns to the zero point of the gradation at the end of the rewind operation, the protuberance 15 of the contact plate 9 urges the switch 42 to drive it again to the solid line side shown in FIG. 5, whereupon the source voltage appears at the B terminal of the delaying relay 41, so that a predetermined time thereafter the relay switches 22 and 24 are switched to the solid line side. Also, upon engagement of the protuberance 15 with the switch 42, the rotation of the cylindrical member 7 is stopped to stop the indicating pointer 8 at the zero point of the gradation.

It is to be noted that by suitably setting the delay time of the delaying relay 41, the rewind operation continues for this delay time after the zero point of gradation has been reached. Thus, it is possible to ensure that the indicating pointer 8 is reliably returned to the zero gradation point at the time of completion of the rewind operation even if there is a slight error in the position of the indicating pointer 8 relative to the actual tape quantity.

After the reaching of the zero gradation point, the drive member 10 will race on the cylindrical member 7.

Also, according to the invention since the tape drive system becomes operative after the initial tape payout, more particularly from the instant of throwing of the switch 21 to the terminal B, there is no possibility that the tape fails to start to proceed from its position corresponding to the zero position of the indicating pointer 8.

Further, according to the invention by presetting the contact plate 6 to a desired position by rotating the knob shaft 1 through a corresponding angle, when the contact plate 9 rotating with the taking-up of the tape has rotated through the same angle as the contact plate 6, the brushes 16 and 16' come into engagement with the respective contacts 17 and 17', so that such actions as the stopping of the tape may be caused with the engagement.

As has been described, according to the invention since the rewind state of the tape can be retained for a predetermined time after the reaching of the zero gradation point, it is possible to ensure that the indicating pointer reliably indicates the zero gradation point at and after the completion of the rewind operation.

What is claimed is:

1. In a tape transport system including drive means for transporting tape from a supply to a take-up reel and back, apparatus for indicating the amount of tape wound on said take-up reel, comprising:

a rotor coupled to said drive means for rotation therewith;
indicating member;
means frictionally coupling said indicating member to said rotor;
first switching means engaging said indicating member and being switched from a first to a second state when said indicating member is moved from a zero point position to a non-zero point position, respectively;
a power source;
second switching means coupled between said power source and said first switching means for supplying power to said first switching means after a tape drive operation has started;
a delay circuit coupled to said first switching means for producing a delayed output signal when said first switching means is switched between said first and second states; and
means coupled to the output of said delay circuit for stopping said drive means when said delay circuit is energized by the switching of said first switching means from said second to said first state when said indicating member is moved from said non-zero point position to said zero point position.

2. The indicating apparatus according to claim 1, further comprising:

a shaft rotatably mounted on said tape transport system, said indicating member being fixed to said shaft for rotation therewith;
a switch contact member fixed to said shaft for rotation therewith, said switch contact member engaging said first switch means when said indicating member is at said zero point position; and
gear means coaxially mounted on said shaft, said gear means engaging said shaft through frictional contact, and said gear means engaging and being driven by said rotor.

3. The indicating apparatus according to claim 2, wherein said first switching means includes a stop member against which said switch contact member abuts to prevent movement of said shaft in the reverse direction past said zero point position.

* * * * *